United States Patent [19]

Usui

[11] Patent Number: 4,763,236

[45] Date of Patent: Aug. 9, 1988

[54] DC-DC CONVERTER

[75] Inventor: Hiroshi Usui, Tokyo, Japan

[73] Assignee: Sanken Electric Co., Ltd., Saitama, Japan

[21] Appl. No.: 4,341

[22] Filed: Jan. 15, 1987

[30] Foreign Application Priority Data

Jan. 16, 1986 [JP] Japan .................................. 61-6668

[51] Int. Cl.$^4$ .......................................... H02M 3/335
[52] U.S. Cl. ................................... 363/19; 363/97
[58] Field of Search ...................... 363/19–21, 363/97, 131; 331/112; 323/289

[56] References Cited

U.S. PATENT DOCUMENTS 4,183,080 1/1980 Liebman .............................. 363/18

FOREIGN PATENT DOCUMENTS

| 49-73615 | 7/1974 | Japan . | |
| 0109171 | 8/1980 | Japan .................................. | 363/19 |
| 58-25581 | 2/1983 | Japan . | |
| 59-148563 | 8/1984 | Japan . | |
| 0046772 | 3/1985 | Japan .................................. | 363/19 |
| US84/00622 | 11/1984 | PCT Int'l. Appl. ................... | 363/19 |

Primary Examiner—Peter S. Wong
Attorney, Agent, or Firm—Woodcock Washburn Kurtz Mackiewicz & Norris

[57] ABSTRACT

A DC-DC converter for supplying stabilized DC power to a load comprises a transformer, a switch, a starting circuit, a resistor, a capacitor, a control circuit, and a rectifying and smoothing circuit. The transformer has a primary winding, a secondary winding and a tertiary winding. The primary winding of the transformer is connected in series to the switch. The secondary winding of the transformer is connected to the rectifying and smoothing circuit, and the tertiary winding is connected to a control terminal of the switch so as to drive the switch by positive feedback voltage. The capacitor is charged and discharged in response to the ON/OFF operation of the switch. The control circuit converts the switch from the ON state into the OFF state in response to the voltage of the control circuit. The power loss of the DC-DC converter is little.

2 Claims, 5 Drawing Sheets

DC-DC CONVERTER

BACKGROUND OF THE INVENTION

The present invention relates to a DC-DC converter for supplying DC power to a load, and more specifically to a switching regulator for supplying regulated voltage to a load.

A typical switching regulator as disclosed in Japanese Laid Open Utility Model application No. 58-25581 for example, comprises a primary winding of a transformer connected to a DC power source, a switching transistor connected in series to the primary winding, a secondary winding of the transformer, a rectifying and smoothing circuit connected between the secondary winding and a load, an error amplifier for comparing output voltage of the rectifying and smoothing circuit with reference voltage, a triangular wave generator, a comparator for comparing the triangular wave with the error output and forming PWM (pulse width modulation) signal, and a drive circuit connected to the comparator and the switching transistor. The DC-DC converter of PWM type is advantageous in that the switching transistor can be turned on or off stably at constant frequency, whereas it is disadvantageous in that since the triangular generator, the comparator and the drive circuit are required the cost becomes high.

Another typical switching regulator as disclosed in Japanese Laid Open patent application No. 59-148653 for example, comprises a primary winding of a transformer connected to a DC power source, a switching transistor connected in series to the primary winding, a secondary winding of the transformer, a rectifying and smoothing circuit connected between the secondary winding and a load, a tertiary winding connected between base and emitter of the switching transistor and coupled in electromagnetic coupling with the primary winding so as to drive the switching transistor, and a voltage control means. The switching transistor of the DC-DC converter having the tertiary winding is driven by positive feedback voltage obtained at the tertiary winding. Consequently, the circuit constitution of the DC-DC converter is simplified. In the DC-DC converter of positive feedback type, assuming that collector current of the switching transistor is Ic, base current is IB and current amplification factor is hFE, when the collector current Ic increases gradually and becomes Ic=IB x hFE, the switching transistor is turned off. The output voltage is adjusted by varying amount of the base current IB. For example, if the base current is decreased, the ON time width of the switching transistor is narrowed and the output voltage is lowered. The base current is adjusted by bypassing a part of the base current supplied from the tertiary winding to the switching transistor. Consequently, the bypassed current produces power loss.

Japanese Laid Open patent application No. 49-73615 discloses a DC-DC converter which comprises a primary winding of a transformer connected to a DC power source, a switching transistor connected in series to the primary winding, a secondary winding of the transformer, a rectifying and smoothing circuit connected between the secondary winding and a load, a tertiary winding connected between base and emitter of the switching transistor and coupled in electromagnetic coupling with the primary winding so as to drive the switching transistor, a quartic winding coupled in electromagnetic coupling with the primary winding so as to control magnetic flux of the transformer, a switch for shortcircuiting the quartic winding selectively. In the DC-DC converter having the quartic winding, if the time width for shortcircuiting the quartic winding is varied, time until the magnetic flux is returned to zero, i.e., reset time is varied. As a result, the OFF time width of the switching transistor is varied. In the DC-DC converter, however, the quartic winding and the short-circuit control circuit therefore are required thereby reduction of the cost becomes difficult.

SUMMARY OF THE INVENTION

An object of the invention is to provide a DC-DC converter wherein circuit constitution is simple and power loss is little.

A DC-DC converter of the invention to attain the above object comprises a pair of input terminals, a transformer, a switch, a rectifying and smoothing circuit, a starting circuit means, a resistor, a capacitor, a charging and discharging means, and a control means. The transformer has a main winding, an auxiliary winding and a voltage output means. The main winding is connected between one and other of the pair of input terminals through the switch. When voltage beyond the threshold voltage of the switch is applied to the control terminal, the switch at the OFF state is turned on. If the switch is turned on, positive feedback voltage is obtained at the auxiliary winding and the switch is driven by the positive feedback voltage. The charging and discharging means starts charging of the capacitor when the switch at the OFF state is turned on. When the voltage of the capacitor rises to prescribed value, the control means converts the switch into the OFF state. If the switch is turned off, the reset operation of the transformer is produced and the reverse voltage is generated at the auxiliary winding. When the reverse voltage is generated, the switch is held to the OFF state. If the reset operation of the transformer is finished, ringing voltage is generated at the main winding and the auxiliary winding. The switch is turned on in response to ringing voltage generated at the auxiliary winding or sum of the ringing voltage and voltage supplied from the starting circuit means. Current supplied from the charging and discharging means to the capacitor varies depending on variation of the load voltage. If the load voltage is low, the charge current is decreased and therefore the charging speed of the capacitor becomes slow. As a result, the ON period of the switch becomes long.

The above and other objects, features and advantages of this invention and the manner of attaining them will become more apparent, and the invention itself will best be understood, from a study of the following description of preferred embodiments illustrated in the attached drawings.

DESCRIPTION OF PREFERRED EMBODIMENTS

Figure 1:
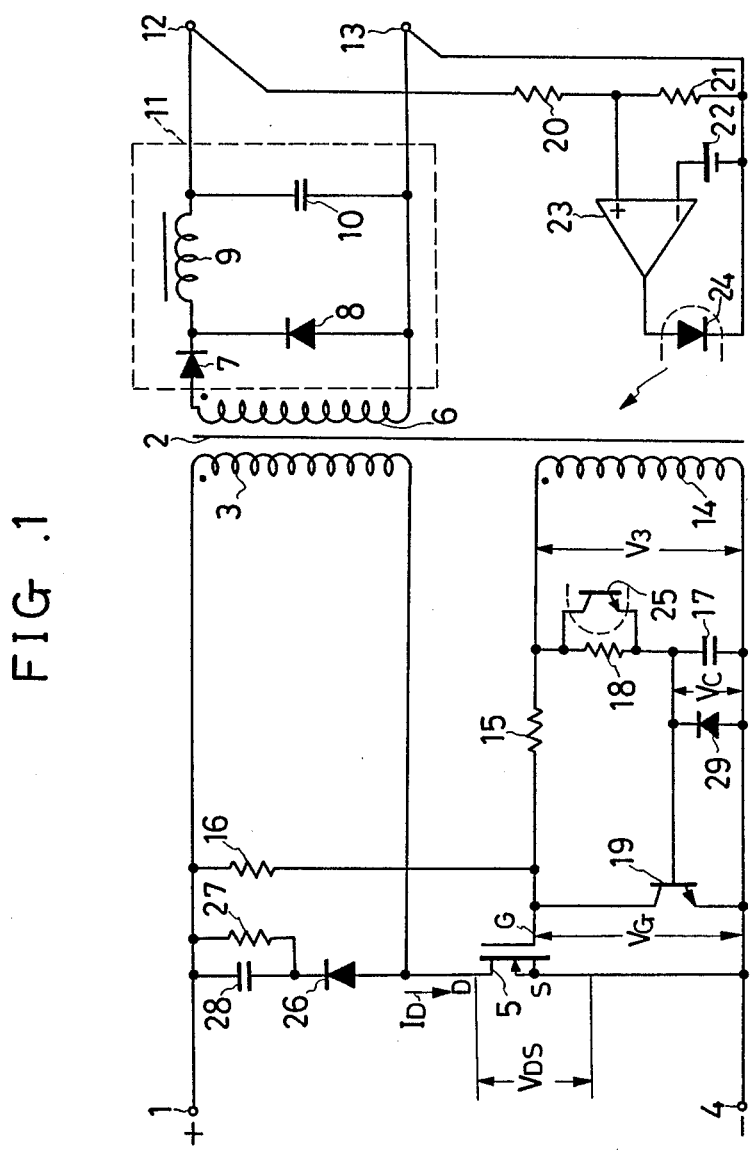
FIG. 1 is a circuit diagram of a DC-DC converter as a first embodiment of the invention.

FIG. 1 shows a DC-DC converter as a first embodiment of the invention. A primary winding 3 of a transformer 2 is connected between one input terminal 1 and other input terminal 4 for connection to a DC power source (not shown). N-channel MOS type field effect transistor (FET) 5 is connected in series to the primary winding 3 for voltage conversion. The FET 5 comprises drain connected to the primary winding 3, source connected to other input terminal 4, and gate to control ON/OFF state between source and drain. Since the FET 5 has the threshold voltage VTH, when voltage beyond the threshold voltage VTH is applied between gate and source the FET 5 is converted from the OFF state into the ON state.

In order to obtain output voltage corresponding to voltage or energy of the primary winding 3, a secondary winding 6 is coupled in electromagnetic coupling with the primary winding 3. A rectifying and smoothing circuit 11 connected between the secondary winding 6 and a pair of DC output terminals 12, 13 to connect a load (not shown), comprises two diodes 7, 8, a reactor 9 and a capacitor 10. A tertiary winding 14 coupled in electromagnetic coupling with the primary winding 3 is connected between gate and source so as to drive the FET 5.

First and second resistors 15, 16 are installed to convert the FET 5 from the OFF state into the ON state. The first resistor 15 is connected in series to the tertiary winding 14, and the second resistor 16 is connected between one input terminal 1 and gate of the FET 5. Consequently, power source voltage supplied between the pair of input terminals 1, 4 is divided by the first resistor 15 and the second resistor 16, and the divided voltage is supplied to the gate. Of course, the divided voltage is set higher than the threshold voltage VTH of the FET 5.

A capacitor 17 serving to convert the FET 5 from the ON state into the OFF state is connected in parallel to the tertiary winding 14 through a third resistor 18. A diode 29 is connected in parallel to the capacitor 17 so that reverse charging voltage of the capacitor 17 is made constant.

A control transistor 19 for converting the FET 5 from the ON state into the OFF state and discharging the capacitor 17, comprises collector, emitter and base. Collector of the control transistor 19 is connected to gate of the FET 5. Emitter of the transistor 19 is connected to source of the FET 5 and also to a lower terminal of the capacitor 17. Base of the transistor 19 is connected to an upper terminal of the capacitor 17.

In order to detect voltage between the pair of output terminals 12, 13, two resistors 20, 21 are connected between the pair of output terminals 12, 13. An error amplifier 23 has one input terminal connected to the voltage dividing point of the two resistors 20, 21, other input terminal connected to a reference voltage source 22, and an output terminal connected to a light emitting diode 24. The light emitting diode 24 emits light in response to output obtained from the error amplifier 23. A photo transistor 25 in photo-coupling with the light emitting diode 24 is connected in parallel to the resistor 18. The photo transistor 15 controls the charging current of the capacitor 17.

In order to reset residual magnetism of the transformer 2 by flyback voltage, a resistor 27 is connected in parallel to the primary winding 3 through a diode 26. In order to suppress the flyback voltage, a capacitor 28 is connected in parallel to the resistor 27.

Figure 2:
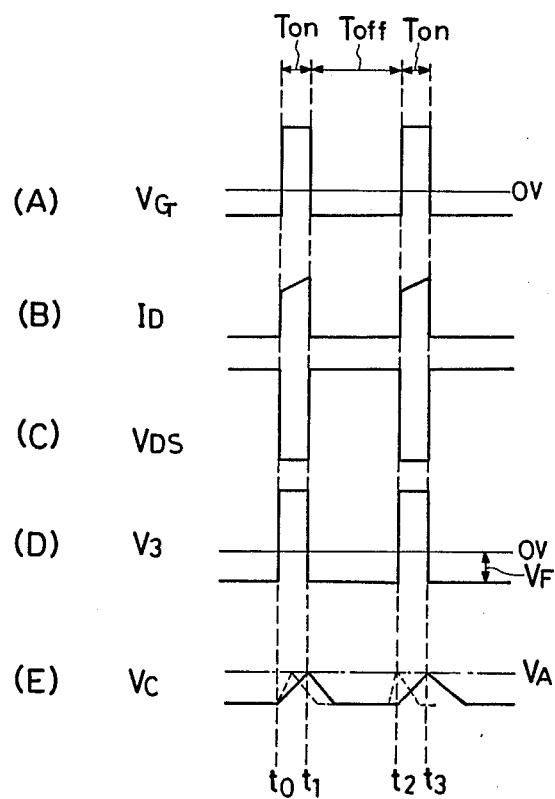
FIG. 2 is a waveform chart of the DC-DC converter in FIG. 1 illustrating gate voltage VG, drain current ID, drain source voltage VDS, tertiary winding voltage V3 and capacitor voltage Vc.

The DC-DC converter of FIG. 1 acts as shown in voltage and current waveforms of FIG. 2. When DC voltage is applied to the pair of input terminals 1, 4, the power source voltage is divided by the first resistor 15 and the second resistor 16, and the divided voltage is applied to gate of the FET 5 thereby the FET 5 is converted from the ON state into the OFF state. During the ON period Ton of the FET 5, most of the input source voltage supplied between the pair of input terminals 1, 4 is applied to the primary winding 3. As a result, positive feedback voltage V3 as shown in FIG. 2(D) is generated at the tertiary winding 14. Since the voltage V3 of the tertiary winding 14 is higher than the voltage applied to the gate through the resistor 16, sufficient gate voltage VG can be supplied to the FET 5. As a result, the FET 5 is rendered conductive sufficiently. Since the primary winding 3 has inductance, the drain current ID increases slantwise as shown in FIG. 2(B). Since voltage corresponding to the voltage of the primary winding 3 is induced at the secondary winding 6 during the ON period of the FET 5, DC output voltage corresponding to the voltage of the secondary winding 6 is obtained at output stage of the rectifying and smoothing circuit 11.

The voltage V3 of the tertiary winding 14 during the ON period Ton of the FET 5 serves also as power source to charge the second capacitor 17. The voltage Vc of the capacitor 17 is charged to the positive polarity through the resistor 18 and the photo transistor 25 during period of $t_0 \sim t_1$ and period of $t_2 \sim t_3$ in FIG. 2(E). Gradient of the voltage Vc of the capacitor 17 is determined by the charging time constant based on the resistor 18, the photo transistor 25 and the capacitor 17. Since the transistor 19 has the threshold voltage, even if the charging of the capacitor 17 is started, the transistor 19 is not immediately turned on. When the voltage Vc of the capacitor 17 becomes the threshold voltage VA of the transistor 19 at time t1 or t3 as shown in FIG. 2(E), the transistor 19 is converted from the OFF state into the ON state. As a result, the transistor 19 short-circuits between gate and source of the FET 5, and also constitutes the discharge circuit of the capacitor 17. If the FET 5 is shortcircuited between gate and source by the transistor 19, the FET 5 is converted from the ON state into the OFF state. During the OFF period Toff of the FET 5, reset operation of the transformer 2 is produced. That is, current flows through the closed circuit composed of the primary winding 3, the diode 26 and the resistor 27, thereby the transformer 2 is reset. Based on the reset operation of the transformer 2, reverse voltage, i.e., flyback voltage VF is generated at the tertiary winding 14 as shown in FIG. 2(D). The flyback voltage VF applies reverse bias to the FET 5 between gate and source. Further, the reverse voltage of the tertiary winding 14 allows discharge of the capacitor 17 and then charges the capacitor 17 to the reverse polarity.

If the reset of the transformer 2 is finished, ringing voltage is generated at respective windings 3, 6, 14 of the transformer 2. When the ringing voltage of the tertiary winding 14 omitted in FIG. 2(D) is applied to gate of the FET 5, the FET 5 is converted from the OFF state into the ON state. If the ON/OFF operation of the FET 5 is started in such manner, the DC power source voltage is applied to the primary winding 3 intermittently and voltage corresponding to the voltage of the primary winding 3 is obtained at the secondary winding 6 thereby the voltage of the secondary winding 6 is converted into DC voltage by the rectifying and smoothing circuit 11.

If it is assumed that the voltage between the output terminals 12, 13 becomes higher than desired value, the output voltage of the error amplifier 23 becomes high and the light quantity of the light emitting diode 24 increases. As a result, resistance of the photo transistor 25 becomes low and the current flowing through the photo transistor 25 increases, thereby the charging current of the capacitor 17 also increases. Since the charging current increases, the voltage Vc of the capacitor 17 rapidly rises as shown in broken line of FIG. 2(E) and attains to the threshold voltage VA. Consequently, the ON period Ton of the FET 5 becomes short, and the DC output voltage is returned to the desired value. When the DC output voltage is higher than the desired value, reverse operation to the above description regarding the lower voltage is effected.

As clearly understood from the above description, the DC-DC converter in FIG. 1 has advantages as follows:

(1) Since the triangular wave generator and the voltage comparator are not used, the circuit constitution is simplified.

(2) The transistor 19 is turned on instantaneously at the conversion of the FET 5 from the ON state into the OFF state, and rendered off at other period. Consequently, the power loss in the transistor 19 is little.

(3) Charge and discharge of the capacitor 17 are performed depending on the voltage of the tertiary winding 14. Consequently, starting of the charge of the capacitor 17 is accurately synchronized with the conversion of the FET 5 from the OFF state into the ON state.

(4) The diode 29 connected in parallel to the capacitor 17 is turned on by the flyback voltage of the tertiary winding 14, i.e., the reverse voltage. Consequently, voltage value of the capacitor 17 charged in reverse direction based on the flyback voltage is limited to be coincident to the forward voltage drop of the diode 29.

Figure 3:
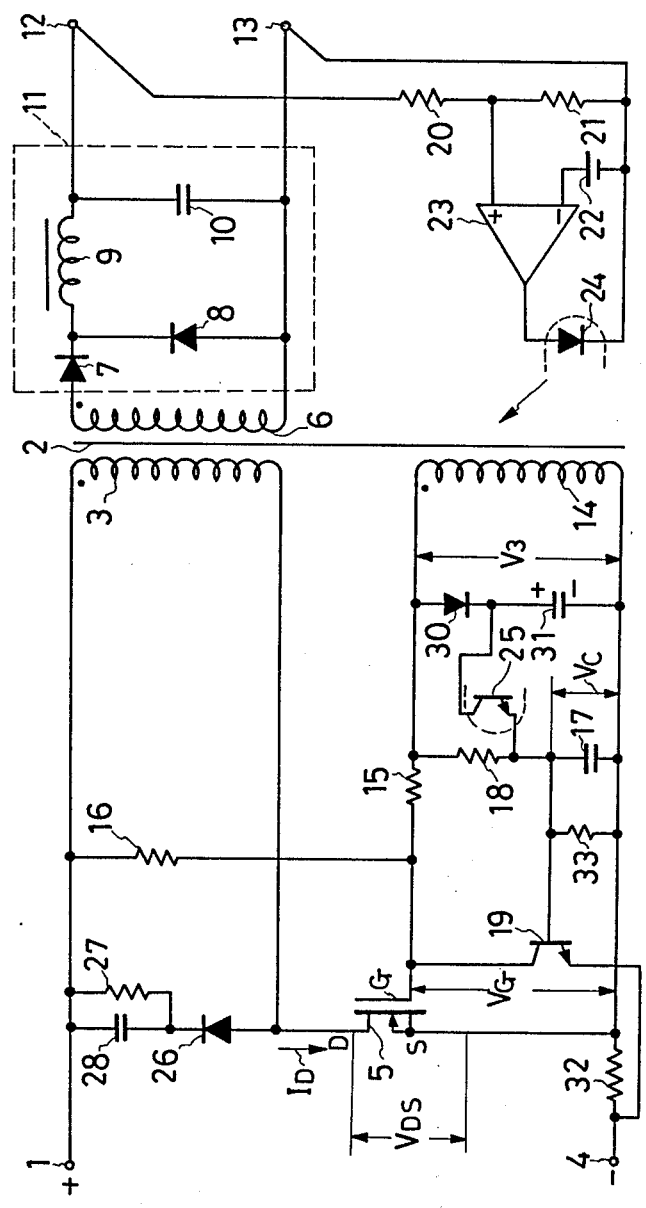
FIG. 3 is a circuit diagram of a DC-DC converter as a second embodiment of the invention.

FIG. 3 shows a DC-DC converter as a second embodiment of the invention. Many parts in FIG. 3 are coincident to that in FIG. 1. Consequently, parts in FIG. 3 corresponding to that in FIG. 1 are designated by the same reference numerals. The DC-DC converter in FIG. 3 comprises a diode 30, a capacitor 31, a current detecting resistor 32, a resistor 33 in addition to the same circuit elements as that in FIG. 1. Since the capacitor 31 is connected in parallel to the tertiary winding 14 through the diode 30, it acts as the DC voltage source. Since the photo transistor 25 is connected between the first capacitor 17 and the second capacitor 31, current to charge the first capacitor 17 is supplied from the second capacitor 31. The resistor 33 connected in parallel to the first capacitor 17 has similar function to that of the diode in FIG. 1.

The resistor 32 for detecting current of the FET 5 is connected between source of the FET 5 and other input terminal 4. Emitter of the transistor 19 is connected to the left end of the current detecting resistor 32. Consequently, sum of the voltage Vc of the capacitor 17 and the voltage across the current detecting resistor 32 is applied between base and emitter of the transistor 19. If overcurrent flows through the FET 5, the voltage of the current detecting resistor 32 will become high. As a result, the transistor 19 is turned on early with respect to the time that the charging of the capacitor 17 in the positive direction is started, thereby the ON time width of the FET 5 is narrowed.

Figure 4:
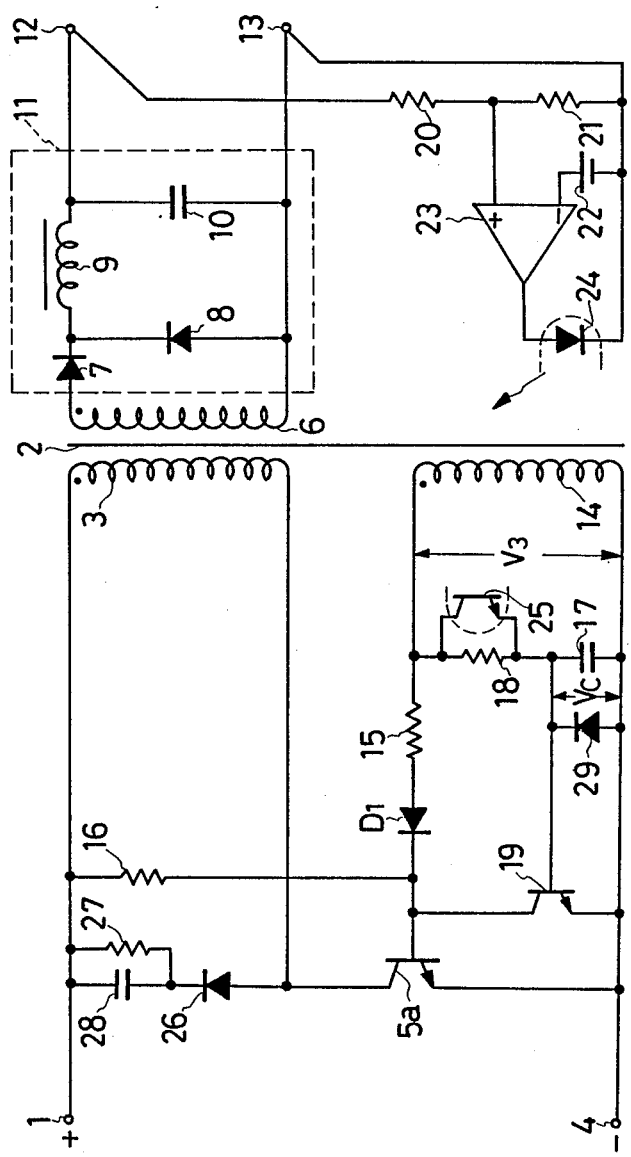
FIG. 4 is a circuit diagram of a DC-DC converter as a third embodiment of the invention.

FIG. 4 shows a DC-DC converter as a third embodiment of the invention. In FIG. 4, parts corresponding to that in FIG. 1 are designated by the same reference numerals. In FIG. 4, a bipolar transistor 5a in place of the FET 5 in FIG. 1 is connected in series to the primary winding 3. Collector of the transistor 5a is connected to the lower end of the primary winding 3, emitter thereof is connected to other input terminal 4, and base thereof is connected to the tertiary winding 14 through the diode D1 and the resistor 15.

If power source voltage is supplied between the pair of input terminals 1, 4, base current of the transistor 5a is supplied through the resistor 16 thereby the transistor 5a is turned on. As a result, positive feedback voltage is generated at the tertiary winding 14, and base current of the transistor 5a is supplied from the tertiary winding 14. Since the transistor 19 is at the OFF state then, power loss is not produced by the transistor 19. In the DC-DC converter disclosed in Japanese Laid Open patent application No. 59-148563, base current of the transistor 5a is bypassed thereby power loss is produced based on the bypass current. On the contrary, in the DC-DC converter of FIG. 4, since base current is not bypassed in the transistor 19, power loss is not produced in the transistor 19.

Figure 5:
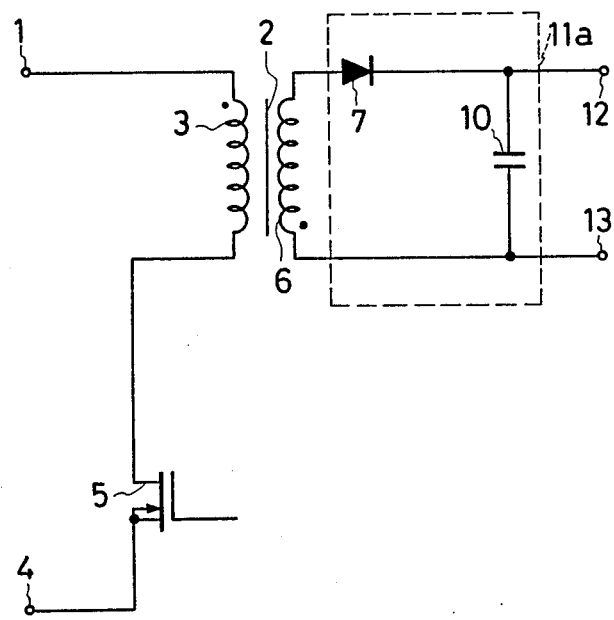
FIG. 5 is a circuit diagram of a part of a DC-DC converter where the transformer and the rectifying and smoothing circuit shown in FIG. 1, FIG. 3 or FIG. 4 are modified.

The preferred embodiments disclosed herein are meant purely to illustrate or explain and not to impose limitations upon the invention, as a variety of modifications will readily occur to the specialists on the basis of this disclosure. The following is a brief list of such possible modifications:

(1) As shown in FIG. 5, the polarity of the secondary winding 6 may be reversed to that in FIG. 1, FIG. 3 or FIG. 4. The rectifying and smoothing circuit 11a in this case comprises the diode 7 and the capacitor 10. The diode 7 is turned off during the ON period of the FET 5, and turned on during the OFF period of the FET 5. Consequently, the energy stored in the transformer 2 during the ON period of the FET 5 is discharged through the diode 7 during the OFF period of the FET 5.

Figure 6:
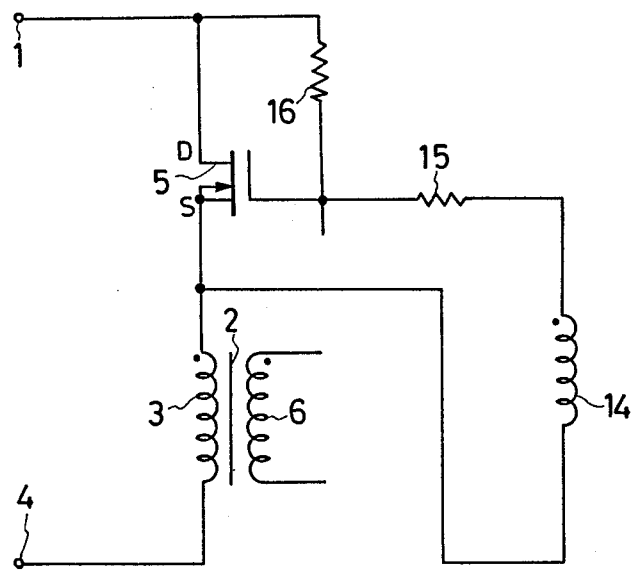
FIG. 6 is a circuit diagram of a part of a DC-DC converter in modification where a transformer is connected to source of a field effect transistor.

(2) As shown in FIG. 6, the transformer 2 may be connected between source of the FET 5 and other input terminal 4.

Figure 7:
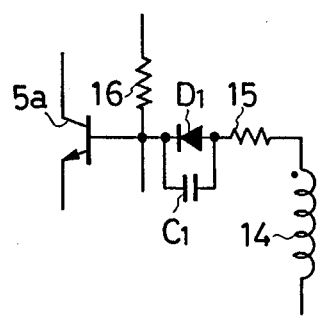
FIG. 7 is a circuit diagram of a part of a DC-DC converter in modification of FIG. 4.

(3) As shown in FIG. 7, a capacitor C1 may be connected in parallel to the diode D1 between the tertiary winding 14 and base of the transistor 5a. In FIG. 1 and FIG. 3, a capacitor of small capacitance to cut DC may be connected in series to the resistor 15.

(4) In place of the FET 5 in FIG. 1, the photo transistor may be connected between the primary winding 3 and the power source terminal 4, and may be controlled by the light emitting diode. In this case, the light emitting diode is controlled by the tertiary winding 14.

(5) The transistor 19 may be made FET.

(6) The transformer 2 may be made auto-transformer.

(7) The resistor 16 in FIG. 1 may be connected between the lower end of the primary winding 3 and gate.

(8) A diode may be connected in series to the transistor 19.

(9) A quartic winding may be installed in the transformer 2, and the capacitor 17 may be charged by voltage of the quartic winding.

(10) The resistor 18 may be omitted and the capacitor 17 may be charged by the photo transistor 25 only.

(11) In place of the photo transistor 25, a transistor controlled electrically may be used.

What is claimed is:

1. A DC-DC converter for supplying DC power to a load, comprising:
    (a) first and second DC supply input terminals;
    (b) a field effect transistor connected between the first and second DC supply input terminals and having drain, source and gate;
    (c) a transformer having a primary winding connected in series with the field effect transistor, a secondary winding and a tertiary winding having a first extremity connected to the gate of the field effect transistor and a second extremity connected to the source of the field effect transistor;
    (d) a rectifying and smoothing circuit connected between the secondary winding and the load;
    (e) a first resistor connected between the first extremity of the tertiary winding of the transformer and the gate of the field effect transistor;
    (f) a second resistor connected between the first DC supply terminal and the gate of the field effect transistor;
    (g) a capacitor connected in parallel with the tertiary winding;
    (h) a third resistor connected between the capacitor and the first extremity of the tertiary winding of the transformer;
    (i) a variable conducting element connected in parallel to the third resistor;
    (j) means for controlling the variable conducting element so that the DC output voltage supplied to the load is made constant;
    (k) a current detecting resistor having a first extremity connected to both the source of the field effect transistor and the capacitor, and a second extremity connected to the second DC supply terminal; and
    (l) a transistor having a collector connected to the gate of the field effect transistor, a base connected to the capacitor, and an emitter connected to the second extremity of the current detecting resistor, the transistor becoming conductive in response to the sum of a voltage across the capacitor and a voltage across the current detecting resistor for causing nonconduction through the field effect transistor.

2. A DC-DC converter as set forth in claim 1, further comprising:
    (a) a diode connected between the variable conducting element and the first extremity of the tertiary winding of the transformer; and
    (b) a second capacitor connected between the diode and the second extremity of the tertiary winding of the transformer.

* * * * *